United States Patent
Yamashita (10) Patent No.: US 7,878,856 B2
(45) Date of Patent: Feb. 1, 2011

(54) ELECTRIC POWER OUTLET APPARATUS

(75) Inventor: Akihiro Yamashita, Saga (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 12/067,922

(22) PCT Filed: Oct. 18, 2006

(86) PCT No.: PCT/JP2006/320772
§ 371 (c)(1),
(2), (4) Date: Mar. 24, 2008

(87) PCT Pub. No.: WO2007/046438
PCT Pub. Date: Apr. 26, 2007

(65) Prior Publication Data
US 2010/0151701 A1     Jun. 17, 2010

(30) Foreign Application Priority Data
Oct. 19, 2005     (JP) .............................. 2005-304276

(51) Int. Cl.
*H01R 13/66* (2006.01)
(52) U.S. Cl. ..................... 439/620.21; 439/620.09; 439/491
(58) Field of Classification Search ............ 439/620.09, 439/620.21–620.23, 535, 491
See application file for complete search history.

(56) References Cited

U.S. PATENT DOCUMENTS

| 5,898,130 A | * | 4/1999 | Tansi et al. | 174/66 |
|---|---|---|---|---|
| 5,977,481 A | * | 11/1999 | Worrell et al. | 174/66 |
| 6,496,884 B1 | * | 12/2002 | Friesen | 710/100 |
| 7,456,516 B2 | * | 11/2008 | Suzuki | 307/3 |
| 2005/0003700 A1 | * | 1/2005 | Huang | 439/491 |
| 2006/0214507 A1 | | 9/2006 | Suzuki | |

FOREIGN PATENT DOCUMENTS

| JP | 10-65583 | 3/1998 |
|---|---|---|
| JP | 10-275663 | 10/1998 |
| JP | 2000-244376 | 9/2000 |
| JP | 3074791 | 1/2001 |

(Continued)

OTHER PUBLICATIONS

International Search Report dated Jan. 23, 2007.

(Continued)

*Primary Examiner*—Ross N Gushi
(74) *Attorney, Agent, or Firm*—Dickinson Wright PLLC (57) ABSTRACT

An electric power outlet apparatus for enabling electric machines containing a communication apparatus to be connected to indoor power wiring used for power-line carrier communications easily in an optimum state is provided. A tap part 3 connected to a power plug 1 through a power cord 2 includes an impedance adjustment unit 30 and power jacks 41, 42, 43, and 44 and is housed in a tap casing 100 schematically shown. The power jacks 41 and 42 are connected directly to the power cord 2 and the power jacks 43 and 44 are connected to the power cord 2 through the impedance adjustment unit 30. Color display parts 51, 52, 53, and 54 for indicating the connection state of the power jacks 41, 42, 43, and 44 to the impedance adjustment unit 30 are provided on the periphery of slots on the surface of the tap casing 100.

11 Claims, 8 Drawing Sheets

FOREIGN PATENT DOCUMENTS

| | | |
|---|---|---|
| JP | 2003-188778 | 7/2003 |
| JP | 2003-283390 | 10/2003 |
| JP | 2004-56766 | 2/2004 |
| JP | 2004-304365 | 10/2004 |

OTHER PUBLICATIONS

Microfilm of the specification and drawings annexed to the request of Japanese Utility Model Application No. 185756/1985 (Laid-open No. 92578/1987), Jun. 13, 1987, p. 11, line 6 to p. 12, line 18, Figs. 4-6.

Microfilm of the specification and drawings annexed to the request of Japanese Utility Model Application No. 66642/1990 (Laid-open No. 25181/1992), Feb. 28, 1992, p. 6, line 13 to p. 7, line 12, Fig. 1.

* cited by examiner

ELECTRIC POWER OUTLET APPARATUS

TECHNICAL FIELD

This invention relates to an electric power outlet apparatus connected to power wiring used for power-line carrier communications.

BACKGROUND ART

Power-line carrier communications are communications using a power line for supplying commercial power as a transmission line and usually are conducted by balanced transmission using two lines. In indoor power-line communications, communication machines are connected through a modem to a power supply outlet to which two or three power wires are connected and transmission and reception are executed between the communication machines connected to the outlet.

The indoor power line is not essentially laid as a communication line and thus is not necessarily be placed in an environment suited to communications. For example, if an electric machine (any other electric machine than a communication apparatus for conducting power-line carrier communications) is connected to an outlet, the input impedance of the electric machine is generally small as a high frequency and thus a so-called short stub state is entered and reflection of a high frequency signal occurs in the portion of the outlet and a communication signal is degraded.

Thus, an art of connecting a high-impedance element as a high frequency such as an inductance element between a power line and the power supply passage of an electric machine and resolving degradation of a communication signal is proposed (for example, refer to patent documents 1 and 2). This art makes it possible to suppress the effect of the impedance of an electric machine on power-line carrier communications and also suppress noise occurring from the electric machine.

However, in the arts in patent documents 1 and 2, an inductance element, etc., is connected directly or through a power plug connected to a power outlet, etc., between a power jack to which a power plug of an electric machine and a power line and thus the power outlet to which the inductance element, etc., is connected is used only for electric machine connection and if a communication apparatus is connected to such a power jack, a communication signal is attenuated by the inductance element, etc., and the state is not suited to communications. Therefore, preferably a communication apparatus is not connected to a power outlet, etc., to which the inductance element, etc., is connected.

Patent document 3 describes a power line relay including an output terminal for communication apparatus connection and an output terminal for electric machine connection other than a communication apparatus, and patent document 4 describes a power outlet apparatus including an outlet part for communication apparatus connection and an outlet part for electric machine connection other than a communication apparatus. Such a power line repeater or a power outlet apparatus makes it possible to connect both a communication apparatus and an electric machine other than a communication apparatus.

However, if a power plug of a machine is erroneously inserted, namely, if an electric machine other than a communication apparatus is connected to the output terminal or the outlet part for a communication apparatus, the effect on power-line carrier communications cannot be suppressed and if a communication apparatus is connected to the output terminal or the outlet part for an electric machine other than a communication apparatus, attenuation of a communication signal occurs and it becomes impossible to conduct efficient power-line carrier communications.

Patent document 1: JP-A-2003-283390
Patent document 2: JP-A-2003-188778
Patent document 3: JP-A-2004-304365 (FIG. 7)
Patent document 4: JP-A-10-65583 (FIG. 5)

DISCLOSURE OF THE INVENTION

Problems to be Solved by the Invention

It is therefore an object of the invention to provide an electric power outlet apparatus for enabling electric machines containing a communication apparatus to be connected to indoor power wiring used for power-line carrier communications easily in an optimum state.

Means for Solving the Problems

An electric power outlet apparatus of the invention is an electric power outlet apparatus connected to power wiring used for power-line carrier communications and includes an impedance adjustment unit connected to the power wiring; a plurality of power jacks connected to the power wiring directly or through the impedance adjustment unit; and a connection state display unit for indicating the connection state of each of the power jacks to the impedance adjustment unit.

According to the invention, how the power jack to which any of various electric machines is to be connected is connected to power wiring, namely, whether the power jack is connected directly to indoor power wiring and is in a state favorable for connection of a communication apparatus for conducting power-line carrier communications or the power jack is connected to indoor power wiring through the impedance adjustment unit and is in a state favorable for connection of an electric machine other than a communication apparatus for conducting power-line carrier communications can be determined by intuition. Therefore, various electric machines containing a communication apparatus can be connected to indoor power wiring used for power-line carrier communications easily in an optimum state.

The electric power outlet apparatus of the invention contains an electric power outlet apparatus wherein the connection state display unit indicates the connection state according to at least the color of the nearby portion of the power jack on the surface of a casing for housing the power jack.

The electric power outlet apparatus of the invention contains an electric power outlet apparatus wherein the connection state display unit indicates the connection state according to at least a mark or a character added to the nearby portion of the power jack on the surface of a casing for housing the power jack.

The electric power outlet apparatus of the invention contains an electric power outlet apparatus wherein the connection state display unit indicates the connection state according to at least the shape of a plug slot of the power jack, of a casing for housing the power jack. According to the invention, the connection state of the power jack can be determined according to the shape of the slot and the shape of the power plug of the electric machine to be connected is matched with the shape of the slot, whereby erroneous connection can also be prevented.

The electric power outlet apparatus of the invention contains an electric power outlet apparatus wherein the connection state display unit indicates the connection state according to at least a recess or a projection provided in the nearby portion of the power jack, of a casing for housing the power jack. According to the invention, the connection state of the power jack can be determined according to the presence or absence of the recess or the projection and the recess or the projection corresponding to the power plug of the electric machine to be connected is provided, whereby erroneous connection can also be prevented.

The electric power outlet apparatus of the invention contains an electric power outlet apparatus wherein the projection of the connection state display unit is detachable. According to the invention, it is made possible to connect even a power plug having no recess corresponding to the projection of the electric power outlet apparatus.

The electric power outlet apparatus of the invention contains an electric power outlet apparatus further including a connection changeover switch for switching between direct connection of each of the plurality of power jacks to the power wiring and connection of each of the plurality of power jacks to the power wiring through the impedance adjustment unit, wherein the connection state display unit indicates the connection state according to the state of the connection changeover switch. According to the invention, the connection state can be switched in response to the type of electric machine to be connected (a communication apparatus for conducting power-line carrier communications or any other electric machine than a communication apparatus) and the number of the electric machines to be connected, and a plurality of electric machines can be connected easily in an optimum state.

The electric power outlet apparatus of the invention contains an electric power outlet apparatus wherein the connection changeover switch includes a moving member for moving in a plug inserting direction into the power jack, thereby switching the connection state, and wherein the moving member abuts against the plug and can move. According to the invention, the operation of the switch member, namely, the connection state of the impedance adjustment unit can be controlled according to the shape of the power plug to be connected. Therefore, the power plug of the electric machine to be connected is shaped so as to allow the moving member to be moved, whereby the connection state of the impedance adjustment unit can be automatically changed simply by inserting the power plug and the electric power outlet apparatus can be placed in a favorable state by the electric machine.

The electric power outlet apparatus of the invention contains an electric power outlet apparatus wherein the impedance adjustment unit becomes a high impedance in a use frequency band of the power-line carrier communications.

The electric power outlet apparatus of the invention contains an electric power outlet apparatus wherein the power jack unit includes a power jack of a power outlet, and wherein the impedance adjustment unit is connected to a feeding conductor of the power outlet.

The electric power outlet apparatus of the invention contains an electric power outlet apparatus further including power plug for connecting to the power wiring through any other power jack, wherein the impedance adjustment unit is connected to the power plug, and wherein the plurality of power jacks are connected to the power plug directly or through the impedance adjustment unit.

The electric power outlet apparatus of the invention contains an electric power outlet apparatus wherein the power plug is housed in a first casing, wherein the plurality of power jacks and the impedance adjustment unit are housed in a second casing, and wherein the power plug and the impedance adjustment unit are connected through a power cord.

Advantages of the Invention

As is obvious from the description given above, according to the invention, there can be provided an electric power outlet apparatus for enabling electric machines containing a communication apparatus to be connected to indoor power wiring used for power-line carrier communications easily in an optimum state.

DESCRIPTION OF REFERENCE NUMERALS

1 . . . Power plug
2 . . . Power cord
3 . . . Tap part
10 . . . Power plug casing
10a, 10b . . . Power plug terminal
20a, 20b . . . First connection conductor
21a, 21b . . . Power cable hole
30a, 30b . . . Second connection conductor
30, 34 . . . Impedance adjustment unit
31a, 31b, 32a, 32b . . . Inductance element
33 . . . Electrical capacitance element
41, 42, 43, 44, 45, 46, 47 . . . Power jack
41a, 41b, 42a, 42b, 43a, 43b, 44a, 44b, 45a, 45b, 46a, 46b, 47a, 47b . . . Power jack terminal
41ax, 41bx, 42ax, 42bx, 43ax, 43bx, 44ax, 44bx . . . Slot
51, 52, 53, 54 . . . Color display part
51m, 52m . . . Character display part
51n, 52n . . . Mark display part
51ax, 52ax . . . Slot
61, 62, 63, 64 . . . Power jack
61a, 61b, 62a, 62b, 63a, 63b, 64a, 64b . . . Power jack terminal
71, 72, 73, 74 . . . Connection changeover switch
100, 100a, 100b, 110, 120, 130, 140 . . . Tap casing 200 . . . Power outlet casing
401, 402, 403, 404, 405, 406, 407, 408 . . . Power jack
401ax, 401bx, 402ax, 402bx, 403ax, 403bx, 404ax, 404bx, 405ax, 405bx, 406ax, 406bx, 407ax, 407bx, 408ax, 408bx . . . Slot
411 . . . Recess
412 . . . Projection
510, 520, 530 . . . Power plug
501, 502, 503 . . . Power plug casing
501a, 501b, 502a, 502b, 503a, 503b . . . Power plug terminal
511 . . . Projection
512 . . . Recess
711 . . . Moving member
711a, 711b . . . Contact member
713 . . . Spring member

BEST MODE FOR CARRYING OUT THE INVENTION

Embodiments of the invention will be discussed with the accompanying drawings.

First Embodiment

Figure 1:
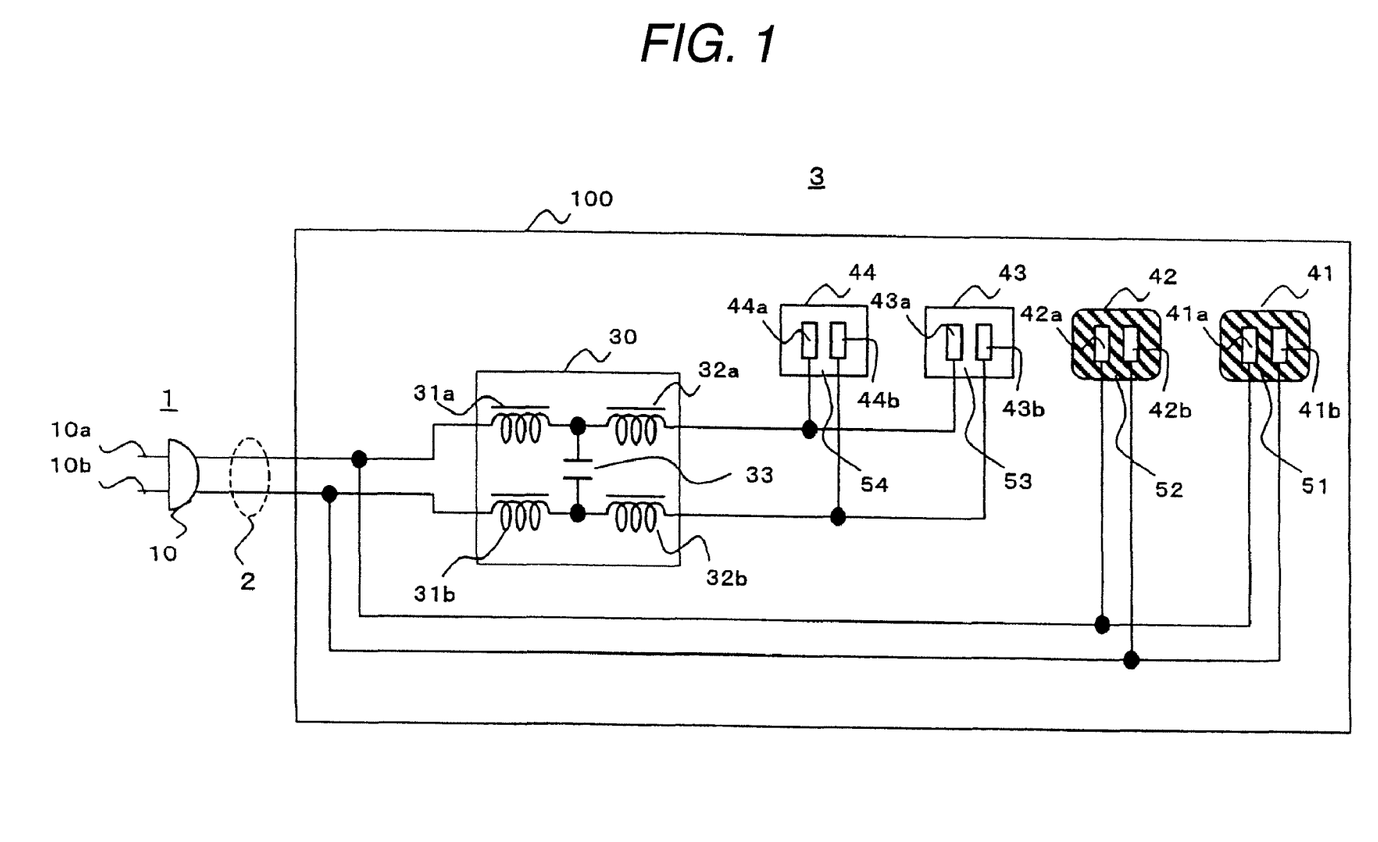
FIG. 1 is a drawing to show the schematic configuration of an example of an electric power outlet apparatus of a first embodiment of the invention.

FIG. 1 shows the schematic configuration of an example of an electric power outlet apparatus of a first embodiment of the invention. The electric power outlet apparatus in FIG. 1 is a table tap including a power plug 1, a power cord 2, and a tap part 3. The power plug 1 is connected to a power outlet of indoor power wiring, another table tap, etc., for receiving power supply and includes a plug casing 10 and power plug terminals 10a and 10b housed in the plug casing 10. The power cord 2 is an example of power wiring and connects the power plug 1 and the tap casing 3.

The tap part 3 includes an impedance adjustment unit 30 and power jacks 41, 42, 43, and 44 and is housed in a tap casing 100 schematically shown. Various electric machines are connected to the power jacks 41, 42, 43, and 44, which include power jack terminals 41a, 41b, 42a, 42b, 43a, 43b, 44a, and 44b. Slots 41ax, 41bx, 42ax, 42bx, 43ax, 43bx, 44ax, and 44bx are formed in the portions corresponding to the positions of the power jack terminals 41a, 41b, 42a, 42b, 43a, 43b, 44a, and 44b of the tap casing 100, as shown in a perspective view of FIG. 2, and power plugs of various electric machines can be inserted thereinto.

The power jacks 41, 42, 43, and 44 are connected to the power plug terminals 10a and 10b via the power cord 2; the power jacks 41 and 42 are connected directly to the power cord 2. The power jacks 43 and 44 are connected to the power cord 2 through the impedance adjustment unit 30. Color display parts 51, 52, 53, and 54 as an example of connection state display units for indicating the connection state of the power jacks 41, 42, 43, and 44 to the impedance adjustment unit 30 are provided on the periphery of the slots on the surface of the tap casing 100 (the positions may be where the power jacks can be distinguished from each other in the proximity of the power jacks). In the example in FIG. 1, the color display units 51 and 52 and the color display units 53 and 54 are displayed in different colors. The display colors of the color display units 51, 52, 53, and 54 may be different from the color of the tap casing 100; the color of one may be the same as the color of the tap casing 100.

The impedance adjustment unit 30 is provided for adjusting the impedance of the power jacks 43 and 44 viewed from the feeding side of power wiring, and includes inductance elements 31a, 31b, 32a, and 32b and an electrical capacitance element 33. The impedance adjustment unit 30 becomes a high impedance (for example, several 100Ω or more, preferably 1000Ω or more: The values are absolute values) in the use frequency band of power-line carrier communications (for example, 2 MHz to 30 MHz). The circuit configuration in FIG. 1 is shown by way of example; only the inductance elements may be inserted in series between the power jack terminals 43a, 43b, 44a, and 44b and the power plug terminals 10a and 10b. A filter of a characteristic for absorbing high frequency noise, pulse property noise, surge property noise, etc., may be configured.

To connect a communication apparatus for conducting power-line carrier communications which may be hereinafter described as "PLC." Not only a communication apparatus discrete unit such as a modem, but also an electric machine incorporating a communication apparatus is contained to the electric power outlet apparatus shown in FIG. 1, preferably the power jack 41, 42 is used because a communication signal is not attenuated. To connect any electric machine other than a communication apparatus for conducting power-line carrier communications (which may be hereinafter described as "non-PLC"), preferably the power jack 43, 44 is used because the effect of the impedance of an electric machine on power-line carrier communications can be suppressed and noise occurring from the electric machine can also be suppressed.

When the power plug of any of various electric machines is inserted, whether or not the power plug is a power plug to which the impedance adjustment unit 30 is connected can be easily checked according to the display color of the color display unit 51, 52, 53, 54 on the periphery of the slot 41ax, 41bx, 42ax, 42bx, 43ax, 43bx, 44ax, 44bx of the tap casing 100, so that connection not preferable for power-line carrier communications can be avoided.

Figure 2:
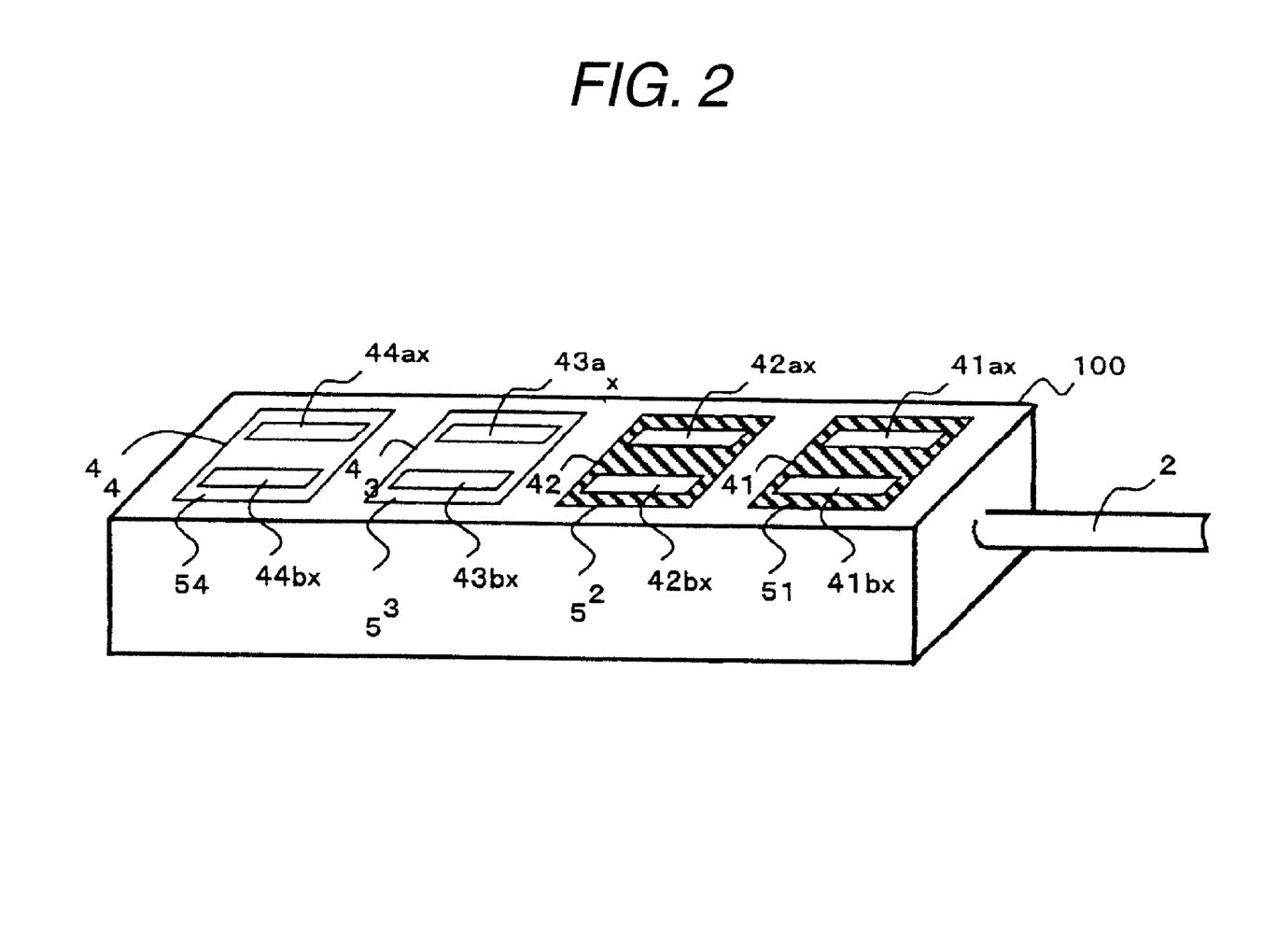
FIG. 2 is a perspective view of an example of a tap part forming a part of the electric power outlet apparatus of the first embodiment of the invention.

In the electric power outlet apparatus in FIGS. 1 and 2, the connection state of the power jacks 41, 42, 43, and 44 to the impedance adjustment unit 30 is indicated on the color display units 51, 52, 53, and 54 on the surface of the tap casing 100, but display of the connection state is not limited to the color display.

Figure 3A:
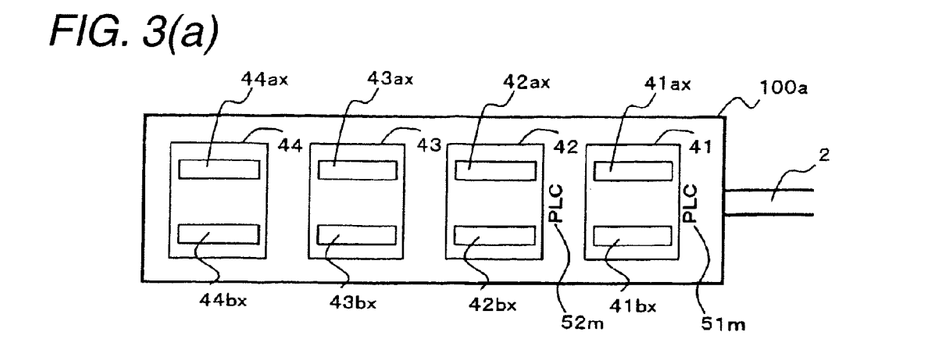
FIGS. 3(a) and 3(b) are top views of other examples of the tap part forming a part of the electric power outlet apparatus of the first embodiment of the invention.
Figure 3B:
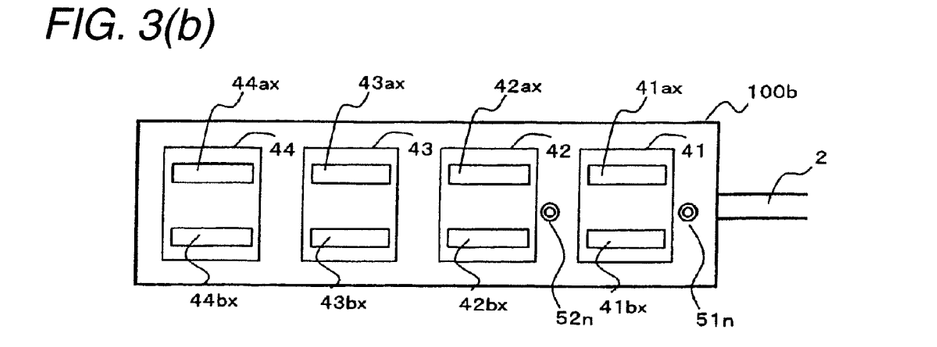

FIG. 3 is top views of other examples of the tap part forming a part of the electric power outlet apparatus of the first embodiment of the invention. Parts identical with those in FIGS. 1 and 2 are denoted by the same reference numerals in FIGS. 3(a) and 3(b) and therefore will not be discussed again. A tap casing 101a in FIG. 3(a) is provided with character strings "PLC" 51m and 52m on the periphery of the power jacks 41 and 42 and a tap casing 101b in FIG. 3(b) is provided with marks "⊙" 51n and 52n on the periphery of the power jacks 41 and 42. The character strings "PLC" 51m and 52m and the marks "⊙" 51n and 52n indicate the power jack terminals 41a, 41b, 42a, and 42b of the power jacks 41 and 42 are connected directly to indoor power wiring. Therefore, when the power plug of any of various electric machines is inserted, the power jack 41, 42 or the power jack 43, 44 can be selected appropriately in response to whether the power plug to be inserted is a power plug of a PLC or a power plug of a non-PLC.

In the tap part in FIG. 3(a) or FIG. 3(b), the character strings "PLC" 51m and 52m or the marks "⊙" 51n and 52n are provided only for the power jacks 41 and 42 to which the impedance adjustment unit 30 is not connected, but a different character string or mark may also be provided for the power jack 43, 44. The character string or the mark can be displayed by print, but may be displayed by providing a dent on the surface of the tap casing. Both a dent and print may be used.

Figure 4:
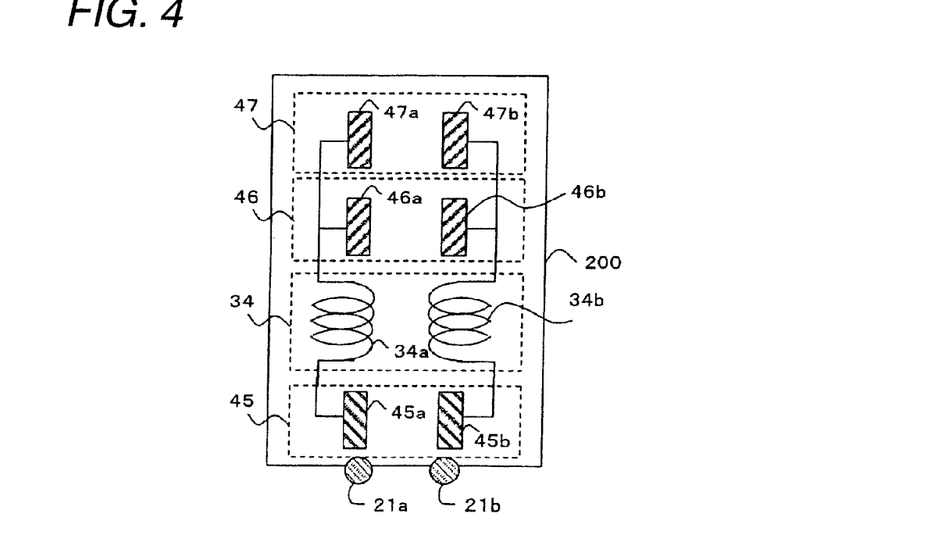
FIG. 4 is a drawing to show the schematic configuration of another example of the electric power outlet apparatus of the first embodiment of the invention.

FIG. 4 shows the schematic configuration of another example of the electric power outlet apparatus of the first embodiment of the invention. The electric power outlet apparatus in FIG. 4 is an outlet provided on an indoor wall, etc., and includes an impedance adjustment unit 34 and power jacks 45, 46, and 47 housed in an outlet casing 200.

Various electric machines are connected to the power jacks 45, 46, and 47, which include power jack terminals 45a, 45b, 46a, 46b, 47a, and 47b. The power jacks 45, 46, and 47 are connected to an indoor power wiring cable (not shown) as an example of power wiring introduced through power cable holes 21a and 21b. As shown in FIG. 4, the power jack 45 is connected directly to the indoor power wiring cable and the power jack 45 is connected to the indoor power wiring cable through the impedance adjustment unit 34.

Like the impedance adjustment unit 30 in FIG. 1, the impedance adjustment unit 34 is provided for adjusting the impedance of the power plugs 46 and 47 viewed from the feeding side of power wiring, and is made up of inductance elements 34a and 34b. The circuit configuration of the impedance adjustment unit 34 is shown by way of example and the circuit configuration in FIG. 1 may be adopted or a filter of a characteristic for absorbing high frequency noise, pulse property noise, surge property noise, etc., may be configured.

The display methods of the connection state of the impedance adjustment unit described above may be used singly or in combination. For example, character display as well as color display is produced, whereby the connection state can be recognized further reliably.

The electric power outlet apparatus in FIG. 4 includes a connection state display unit (not shown) for indicating the connection state of the power jacks 45, 46, and 47 to the impedance adjustment unit 34 on the surface of the outlet casing 200. The connection state display unit adopts color display, character display, mark display, etc. The connection state display unit can be formed in a similar manner to that shown in FIGS. 2 to FIG. 3(b) and therefore will not be discussed again.

The electric power outlet apparatus of the first embodiment of the invention has been described by taking the table tap and the outlet as examples, but can also be configured as an adapter connected to a power jack of an outlet, a table tap, etc. In this case, power plug terminals (similar to power plug terminals 10a and 10b in FIG. 1) for connecting to the power jack of an outlet, a table tap, etc., an impedance adjustment unit, and a plurality of power jacks are housed in a single adapter casing. The configuration of such an adapter is obvious from the description with reference to FIG. 1, FIG. 2, etc., and therefore will not be discussed again.

The electric power outlet apparatus in FIG. 1 is provided with four power jacks and the electric power outlet apparatus in FIG. 4 is provided with three power jacks; the number of the power jacks is arbitrary. Two power jacks are connected to the power supply side through the impedance adjustment unit; the number of the power jacks is arbitrary.

Second Embodiment

An electric power outlet apparatus of a second embodiment of the invention indicates the connection state of each power jack to an impedance adjustment unit and can also prevent erroneous connection of an electric machine (connection not appropriate for power-line carrier communications). In the description to follow, as the electric power outlet apparatus, a table tap is taken as an example, but the electric power outlet apparatus can also be applied to an outlet and an adapter. The circuit configuration of the electric power outlet apparatus of the second embodiment of the invention is basically the same as that of the electric power outlet apparatus of the first embodiment and therefore will not be discussed again.

Figure 5A:
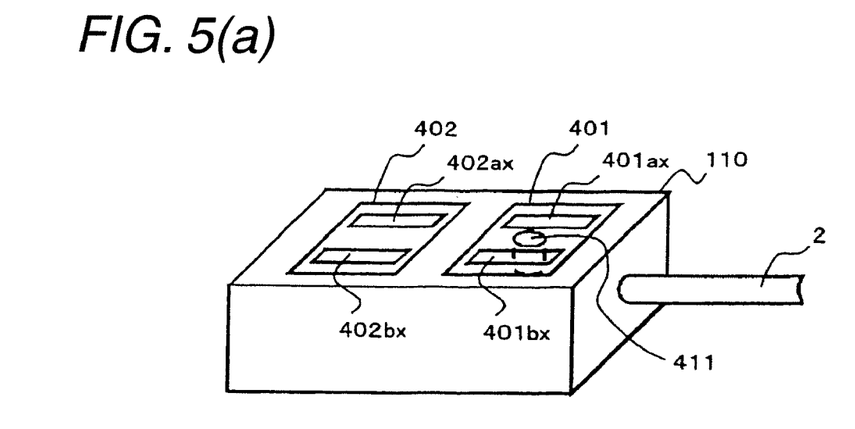
FIGS. 5(a) and 5(b) are drawings to describe an example of an electric power outlet apparatus of a second embodiment of the invention.
Figure 5B:
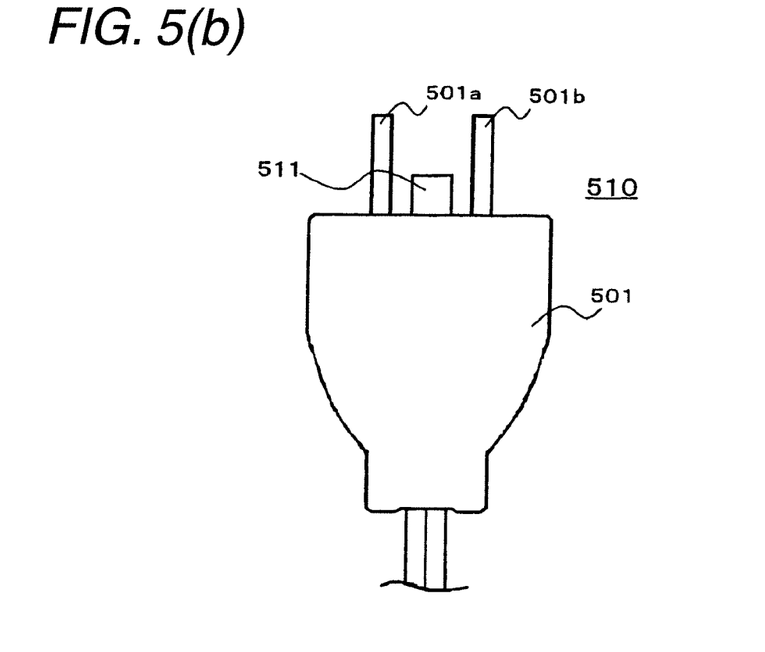

FIGS. 5(a) and 5(b) are drawings to describe an example of the electric power outlet apparatus of the second embodiment of the invention. FIG. 5(a) is a perspective view of an example of a tap part and FIG. 5(b) shows the schematic configuration of a power plug of a PLC appropriate for use of the electric power outlet apparatus in FIG. 5(a).

The tap part in FIG. 5(a) includes power jacks 401 and 402 and a tap casing 110 is formed with slots 401ax, 401bx, 402ax, and 402bx for making it possible to insert power plugs of various electric machines. Power jack terminals (not shown) are provided in the slots 401ax, 401bx, 402ax, and 402bx. The power jack 401 is connected directly to a power cord 2 and the power jack 402 is connected to the power cord 2 through an impedance adjustment unit (not shown).

A recess 411 is provided in the portion between the slots 401 ax and 401bx on the surface of the tap casing 110. This recess 411 indicates the connection state of the power jack to the impedance adjustment unit; in the example in FIG. 5(a), it indicates that the power jack 401 is connected directly to the power cord 2 and that the power jack 402 is connected to the power cord 2 through the impedance adjustment unit. Therefore, when the power plug of any of various electric machines is inserted, the connection state of the impedance adjustment unit can be checked depending on the presence or absence of the recess 411 and connection not preferable for power-line carrier communications can be avoided.

A power plug 510 in FIG. 5(b) includes a plug casing 501 having a projection 511 and power plug terminals 501a and 501b housed in the plug casing 501. The projection 511 is provided on the surface of the plug casing 501 between the power plug terminals 501a and 501b and is fitted into the recess 411 when the power plug 510 is inserted into the power jack 401 in FIG. 5(a).

If an attempt is made to receive power supply from the table tap having the tap part shown in FIG. 5(a) using the power plug 510 as a power plug of a PLC, it can be connected to the power jack 401, but cannot be connected to the power jack 402, so that the PLC is reliably connected to the power jack to which the impedance adjustment unit is not connected. Therefore, attenuation of a communication signal by the impedance adjustment unit can be avoided.

Preferably, the projection 511 of the power plug 510 can be attached to and detached from the plug casing 501 by a method of screwing, fitting, etc. If the projection 511 can be attached to and detached from the plug casing 501, a PLC can also be connected to a power jack not provided with the recess 411, such as the power outlet of the first embodiment, etc.

Figure 6A:
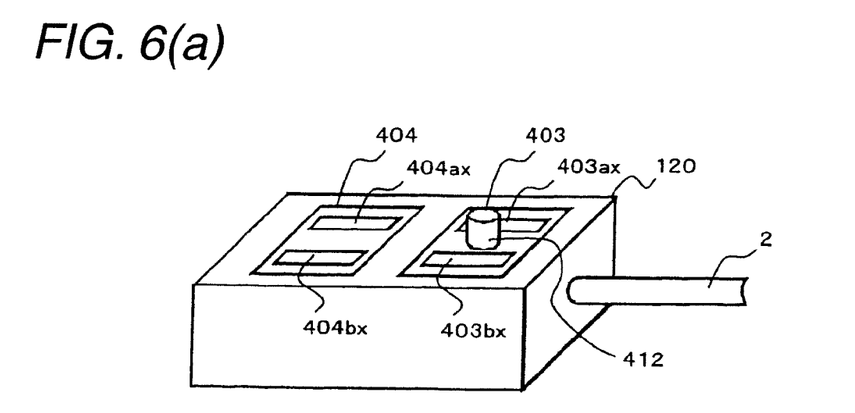
FIGS. 6(a) and 6(b) are drawings to describe another example of the electric power outlet apparatus of the second embodiment of the invention.
Figure 6B:
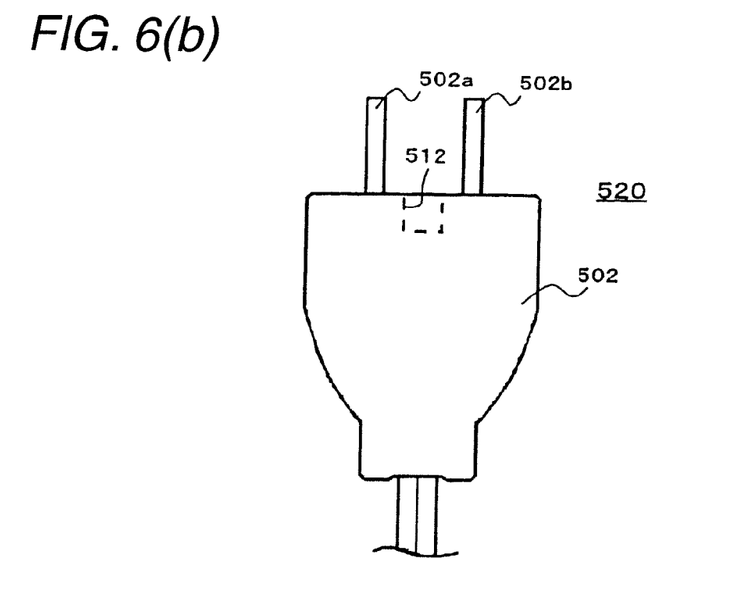

FIGS. 6(a) and 6(b) are drawing to describe another example of the electric power outlet apparatus of the second embodiment of the invention. FIG. 6(a) is a perspective view of an example of a tap part and FIG. 6(b) shows the schematic configuration of a power plug of a PLC appropriate for use of the electric power outlet apparatus in FIG. 6(a).

The tap part in FIG. 6(a) includes power jacks 403 and 404 and a tap casing 120 is formed with slots 403ax, 403bx, 404ax, and 404bx for making it possible to insert power plugs of various electric machines. Power jack terminals (not shown) are provided in the slots 403ax, 403bx, 404ax, and 404bx. The power jack 403 is connected directly to a power cord 2 and the power jack 404 is connected to the power cord 2 through an impedance adjustment unit (not shown).

A projection 412 is provided in the portion between the slots 403ax and 403bx on the surface of the tap casing 120. This projection 412 indicates the connection state of the power jack to the impedance adjustment unit; in the example in FIG. 6, it indicates that the power jack 403 is connected directly to the power cord 2 and that the power jack 404 is connected to the power cord 2 through the impedance adjustment unit. Therefore, when the power plug of any of various electric machines is inserted, the connection state of the impedance adjustment unit can be checked depending on the presence or absence of the projection 412 and in addition, if an attempt is made to insert a power plug by mistake, it cannot be inserted because of interference of the projection 412, so that connection not preferable for power-line carrier communications can be avoided.

A power plug 520 in FIG. 6(b) includes a plug casing 502 having a recess 512 and power plug terminals 502a and 502b housed in the plug casing 502. The recess 512 is provided on the surface of the plug casing 502 between the power plug terminals 502a and 502b and is fitted into the projection 412 when the power plug 520 is inserted into the power jack 403 in FIG. 6(a).

The power plug 520 is used as a power plug of a PLC, whereby it is made possible to connect the PLC to the power jack 403.

Preferably, the projection 412 of the tap casing 120 can be attached to and detached from the tap casing 120 by a method of screwing, fitting, etc. If the projection 412 can be attached to and detached from the tap casing 120, various electric machines including a power plug not provided with the recess 512 can also be connected.

Figure 7A:
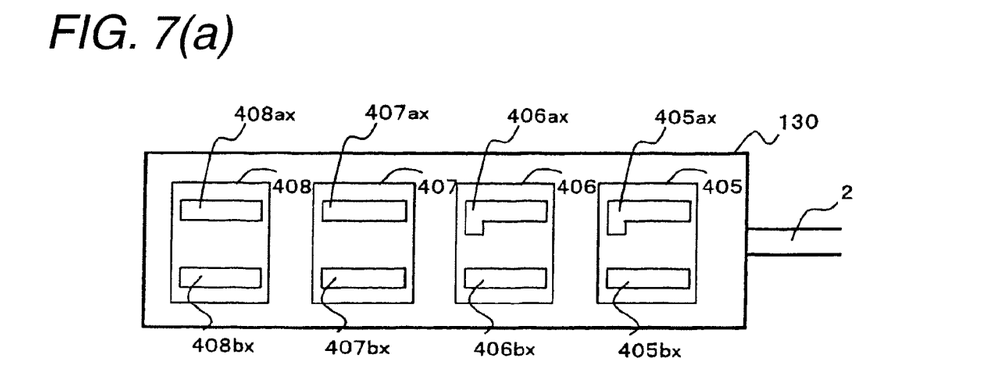
FIGS. 7(a) and 7(b) are drawings to describe still another example of the electric power outlet apparatus of the second embodiment of the invention.
Figure 7B:
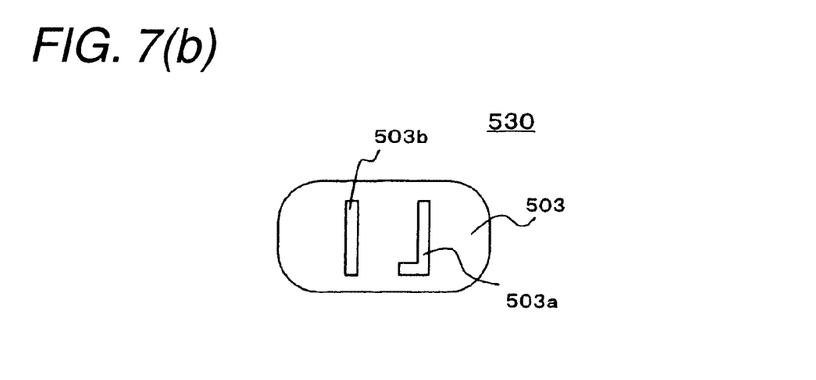

FIGS. 7(a) and 7(b) are drawing to describe still another example of the electric power outlet apparatus of the second embodiment of the invention. FIG. 7(a) is a top view of an example of a tap part and FIG. 7(b) shows the schematic configuration of a power plug of a PLC appropriate for use of the electric power outlet apparatus in FIG. 7(a). FIG. 7(b) is a drawing of viewing the power plug from the plug terminal side.

The tap part in FIG. 7(a) includes power jacks 405, 406, 407, and 408 and a tap casing 130 is formed with slots 405ax, 405bx, 406ax, 406bx, 407ax, 407bx, 408ax, and 408bx for making it possible to insert power plugs of various electric machines. Power jack terminals (not shown) are provided in the slots 405ax, 405bx, 406ax, 406bx, 407ax, 407bx, 408ax, and 408bx. The power jacks 405 and 406 are connected directly to a power cord 2 and the power jacks 407 and 408 are connected to the power cord 2 through an impedance adjustment unit (not shown).

The slots 405ax and 406ax are bent as shown in FIG. 7(a) and have shapes different from those of other slots. The shape indicates the connection state of the power jack to the impedance adjustment unit; in the example in FIG. 7(a), it indicates that the power jacks 405 and 406 are connected directly to the power cord 2 and that the power jacks 407 and 408 are connected to the power cord 2 through the impedance adjustment unit. Therefore, when the power plug of any of various electric machines is inserted, the connection state of the impedance adjustment unit can be checked according to the shape of the slot and connection not preferable for power-line carrier communications can be avoided.

A power plug 530 in FIG. 7(b) includes a plug casing 503 and power plug terminals 503a and 503b housed in the plug casing 503. The power plug terminal 503a is bent as shown in FIG. 7(b) and when the power plug 530 is inserted into the power jack 405 or 406 in FIG. 7(a), the shape allows the power plug 530 to be inserted into the slot 405ax or 406ax. Since the shape does not allow the power plug 530 to be inserted into any other slot, the power plug 530 cannot be into the power jack 407 or 408.

If an attempt is made to receive power supply from the table tap having the tap part shown in FIG. 7(a) using the power plug 530 as a power plug of a PLC, it can be connected to the power jacks 405 and 406, but cannot be connected to the power jack 407 or 408, so that the PLC is reliably connected to the power jack to which the impedance adjustment unit is not connected. Therefore, attenuation of a communication signal by the impedance adjustment unit can be avoided.

In the electric power outlet apparatus of the second embodiment, the number of the power jacks is also arbitrary. The number of the power jacks connected to the power supply side through the impedance adjustment unit is also arbitrary. Although the connection state of the impedance adjustment unit is indicated by the shape of the tap casing, color display, character display, or mark display described in the first embodiment may be used at the same time.

Third Embodiment

Figure 8:
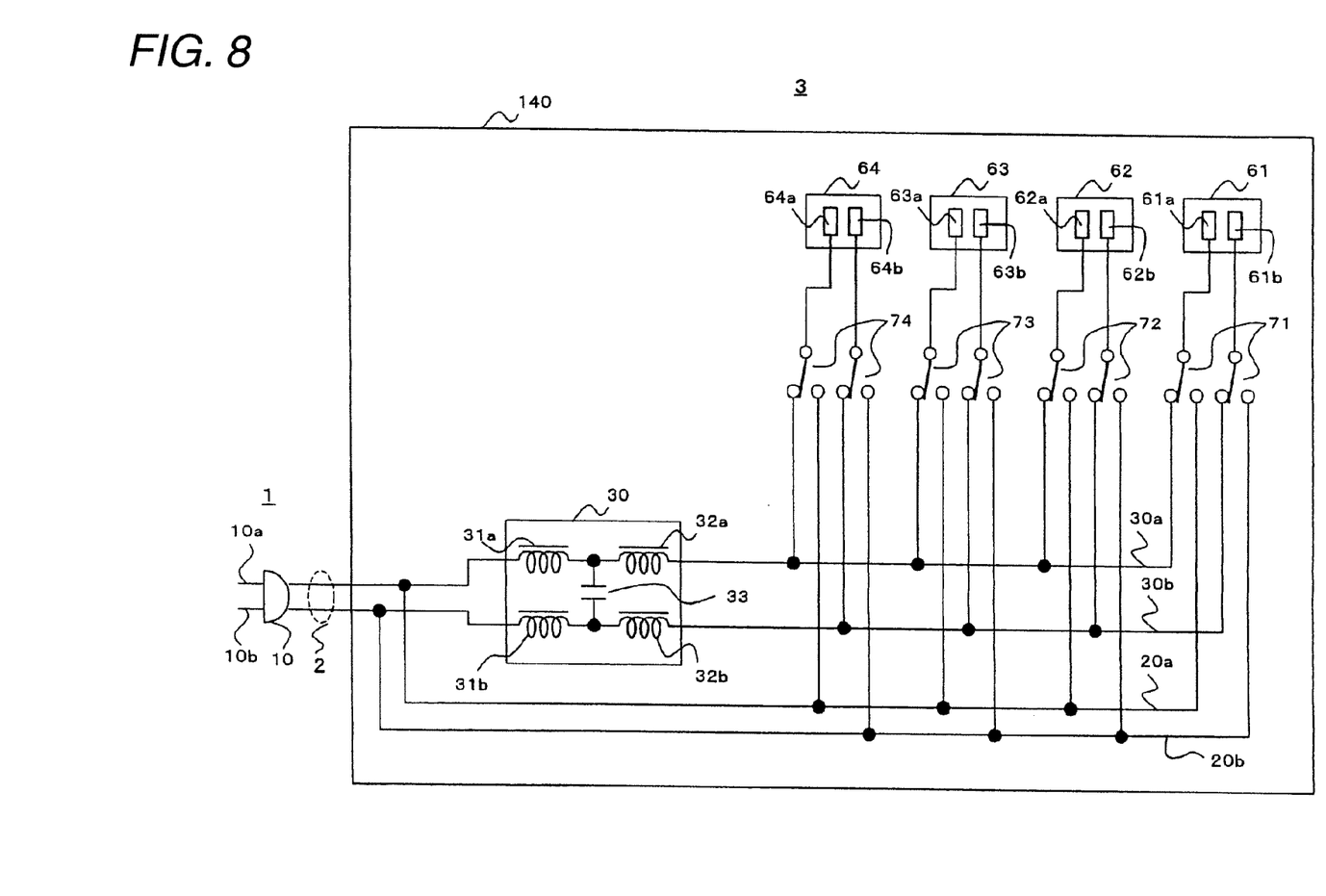
FIG. 8 is a drawing to show the schematic configuration of an example of an electric power outlet apparatus of a third embodiment of the invention.

FIG. 8 is a drawing to show the schematic configuration of an example of an electric power outlet apparatus of a third embodiment of the invention. The electric power outlet apparatus in FIG. 8 is a table tap including a power plug 1, a power cord 2, and a tap part 3. The power plug 1 is connected to a power outlet of indoor power wiring, another table tap, etc., for receiving power supply and includes a plug casing 10 and power plug terminals 10a and 10b housed in the plug casing 10. The power cord 2 is an example of power wiring and connects the power plug 1 and the tap casing 3.

The tap part 3 includes an impedance adjustment unit 30, power jacks 61, 62, 63, and 64, and connection changeover switches 71, 72, 73, and 74 and is housed in a tap casing 140 schematically shown. Various electric machines are connected to the power jacks 61, 62, 63, and 64, which include power jack terminals 61a, 61b, 62a, 62b, 63a, 63b, 64a, and 64b. The connection changeover switches 71, 72, 73, and 74 switch connection of the power jack terminals 61a, 61b, 62a, 62b, 63a, 63b, 64a, and 64b into first conductors 20a and 20b or second conductors 30a and 30b.

The impedance adjustment unit 30 is provided for adjusting the impedance of the power plug switched and connected to the second conductors 30a and 30b, viewed from the feeding side of power wiring, and includes inductance elements 31a, 31b, 32a, and 32b and an electrical capacitance element 33. The impedance adjustment unit 30 is similar to that shown in FIG. 1 and therefore will not be discussed again.

The first conductors 20a and 20b are connected directly to the power cord 2 and the second conductors 30a and 30b are connected to the power cord 2 through the impedance adjustment unit 30. Therefore, if the power jack 61, 62, 63, or 64 is switched and connected to the first conductors 20a and 20b, the power jack becomes a preferable state for a PLC; if the power jack 61, 62, 63, or 64 is switched and connected to the second conductors 30a and 30b, the power jack becomes a preferable state for a non-PLC.

The connection changeover switches 71, 72, 73, and 74 can be switched separately and are switched manually or automatically by power plug connection. The switch state can be visually recognized. Various switches can be used as the connection changeover switches 71, 72, 73, and 74 for manual switching; for example, if a slide switch (not shown) is used, the switch state can be recognized by visually checking the slide state of the switch.

Thus, the connection state of the impedance adjustment unit 30 can be switched in response to the type of electric machine to be connected (PLC or non-PLC) and the number of the electric machines to be connected, so that a plurality of electric machines can be connected easily in an optimum state.

Figure 9A:
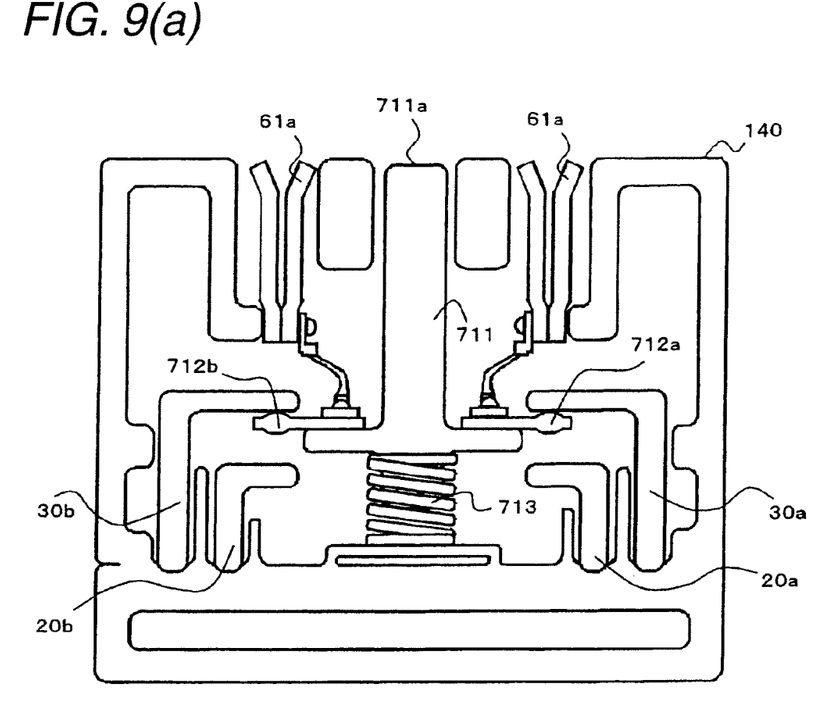
FIGS. 9(a) and 9(b) are drawings to describe the switching operation of an example of the electric power outlet apparatus of the third embodiment of the invention.
Figure 9B:
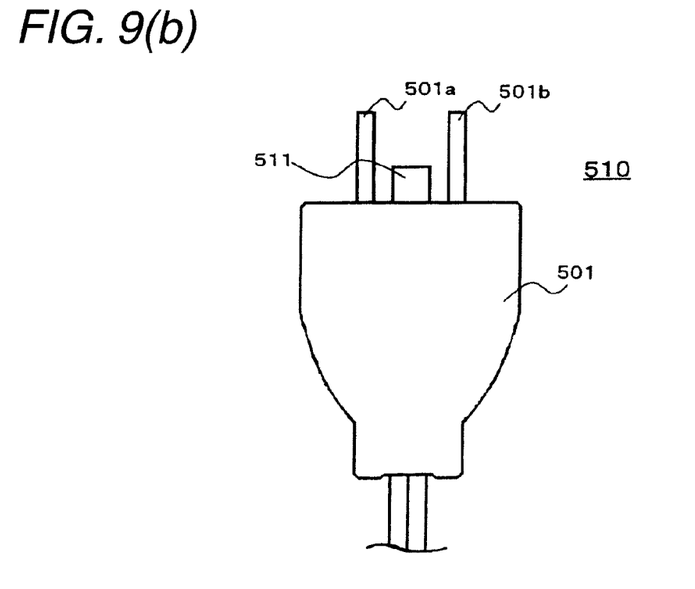

FIGS. 9(a) and 9(b) are drawing to describe the switching operation of an example of the electric power outlet apparatus of the third embodiment of the invention. FIG. 9(a) is a sectional view of an example of the tap casing 140 and FIG. 9(b) shows the schematic configuration of a power plug of a PLC appropriate for use of the electric power outlet apparatus in FIG. 9(a).

FIG. 9(a) shows a cross section of the portion of the power jack 61 of the tap casing 140 in a direction of crossing the power jack terminals 61a and 61b; it shows a moving member 711, contact members 712a and 712b, and a spring member 713 making up the connection changeover switch 71.

The moving member 711 is supported movably in an up and down direction in the figure (insertion, removal direction of power plug into, from the power jack 61) (support member is not shown in the figure) and is urged in the up direction in the figure by the spring member 713. The power jack terminals 61a and 61b and the contact members 712a and 712b electrically connected are supported mechanically integrally on the spring member 713 and move up and down with a move of the moving member 711. The contact members 712a and 712b are in contact with the second conductors 30a and 30b in a state in which the moving member moves in the up direction by the spring member 713. Therefore, in this state, the power jack 61 is connected to the power cord 2 through the impedance adjustment unit 30.

When the moving member 711 moves in the down direction in the figure, the power jack terminals 61a and 61b and the contact members 712a and 712b move at the same time and the contact members 712a and 712b come in contact with the first conductors 20a and 20b. Therefore, when this state is entered, the power jack 61 is connected directly to the power cord 2.

Thus, the moving member 711 is moved up and down, whereby the connection state of the connection changeover switch 71 can be switched. The switch state of the connection changeover switch 71 can be recognized by visually inspecting the position of an upper end face 711a of the moving state 711. That is, the upper end face 711a of the moving member 711 is almost flush with the upper face of the tap casing 140, so that it can be reliably recognized that the impedance adjustment unit 30 is connected to the power jack terminals 61a and 61b.

A power plug 510 in FIG. 9(b) includes a plug casing 501 having a projection 511 and power plug terminals 501a and 501b housed in the plug casing 501; it is the same as that shown in FIG. 5(b). The projection 511 is provided on the surface of the plug casing 501 between the power plug terminals 501a and 501b and when the power plug 510 is inserted into the power jack 61 in FIG. 9(a), the projection abuts against the upper end face 711a of the moving member 711 and moves the moving member 711 downward.

If power supply is received from the table tap having the tap part shown in FIG. 9(a) using the power plug 510 as a power plug of a PLC, when the plug is connected to any of the power jack 61, 62, 63, or 64, the connection changeover switch 71, 72, 73, 74 is automatically switched and connected to the first conductors 20a and 20b. Therefore, the PLC is connected directly to the power supply and attenuation of a communication signal by the impedance adjustment unit can be avoided.

The electric power outlet apparatus in FIG. 8 is provided with the four power jacks 61, 62, 63, and 64, but the number of the power jacks is arbitrary. The connection changeover switches 71, 72, 73, and 74 are connected to all of the four power jacks 61, 62, 63, and 64 for making it possible to switch and connect to the first conductors 20a and 20b or the second conductors 30a and 30b, but the connection changeover switches need not be provided in a one-to-one correspondence with the power jacks. In this case, about the power jack fixedly connected to the first conductors 20a and 20b or the second conductors 30a and 30b, preferably the connection state is displayed by a method as described in the first embodiment or the second embodiment.

The electric power outlet apparatus has been described by taking the table tap as an example, but can also be applied to an outlet and an adapter.

While the invention has been described in detail with reference to the specific embodiments, it will be obvious to those skilled in the art that various changes and modifications can be made without departing from the spirit and the scope of the invention.

This application is based on Japanese Patent Application No. 2005-304276 filed on Oct. 19, 2005, which is incorporated herein by reference.

INDUSTRIAL APPLICABILITY

The invention is useful as an electric power outlet apparatus, etc., for enabling electric machines containing a communication apparatus to be connected to indoor power wiring used for power-line carrier communications easily in an optimum state.

The invention claimed is:

1. An electric power outlet apparatus connected to power wiring used for power-line carrier communications, said electric power outlet apparatus comprising:
    an impedance adjustment unit connected to the power wiring;
    a plurality of power jacks connected to the power wiring directly or through said impedance adjustment unit;
    a connection state display unit for indicating the connection state of each of said power jacks to said impedance adjustment unit; and
    a connection changeover switch for switching between direct connection of each of said plurality of power jacks to the power wiring and connection of each of said plurality of power jacks to the power wiring through said impedance adjustment unit, wherein said connection state display unit indicates the connection state according to the state of the connection changeover switch.

2. The electric power outlet apparatus as claimed in claim 1, wherein said connection state display unit indicates the connection state according to at least the color of the nearby portion of said power jack on the surface of a casing for housing said power jack.

3. The electric power outlet apparatus as claimed in claim 1, wherein said connection state display unit indicates the connection state according to at least a mark or a character added to the nearby portion of said power jack on the surface of a casing for housing said power jack.

4. The electric power outlet apparatus as claimed in claim 1, wherein said connection state display unit indicates the connection state according to at least the shape of a plug slot of said power jack, of a casing for housing said power jack.

5. The electric power outlet apparatus as claimed in claim 1, wherein said connection state display unit indicates the connection state according to at least a recess or a projection provided in the nearby portion of said power jack, of a casing for housing said power jack.

6. The electric power outlet apparatus as claimed in claim 5, wherein the projection of said connection state display unit is detachable.

7. The electric power outlet apparatus as claimed in claim 1, wherein the connection changeover switch includes a moving member for moving in a plug inserting direction into said power jack, thereby switching the connection state, and wherein the moving member abuts against the plug and can move.

8. The electric power outlet apparatus as claimed in claim 1, wherein said impedance adjustment unit becomes a high impedance in a use frequency band of the power-line carrier communications.

9. The electric power outlet apparatus as claimed in claim 1, wherein the plurality of power jacks include a power jack of a power outlet, and wherein said impedance adjustment unit is connected to a feeding conductor of the power outlet.

10. The electric power outlet apparatus as claimed in claim 1, further comprising a power plug for connecting to the power wiring through any other power jack, wherein said impedance adjustment unit is connected to the power plug, and wherein said plurality of power jacks are connected to the power plug directly or through said impedance adjustment unit.

11. The electric power outlet apparatus as claimed in claim 10, wherein the power plug is housed in a first casing, wherein said plurality of power jacks and said impedance adjustment unit are housed in a second casing, and wherein the power plug and said impedance adjustment unit are connected through a power cord.

* * * * *